United States Patent [19]

Thompson

[11] Patent Number: 4,948,933
[45] Date of Patent: Aug. 14, 1990

[54] APPARATUS FOR CUTTING PRECISION NOTCHES IN WORK SURFACES

[75] Inventor: Carroll R. Thompson, Woodlands, Tex.

[73] Assignee: Scan Systems, Inc., Houston, Tex.

[21] Appl. No.: 315,833

[22] Filed: Feb. 27, 1989

[51] Int. Cl.⁵ .................. B23H 1/00; B23H 7/26; B23H 9/00
[52] U.S. Cl. ............................. 219/69.2; 219/69.16
[58] Field of Search ............... 219/69.2, 69.16, 68, 219/69.14, 69.15, 69.17

[56] References Cited

U.S. PATENT DOCUMENTS

| | | | |
|---|---|---|---|
| 3,318,793 | 5/1967 | Webb | 219/69.16 |
| 3,610,865 | 10/1971 | Osenbruggen | 219/69.2 |
| 4,162,383 | 7/1979 | Hamasaki | 219/68 |
| 4,439,659 | 3/1984 | Shimizu | 219/69.2 |
| 4,476,368 | 10/1984 | Cammann et al. | 219/69.16 |

FOREIGN PATENT DOCUMENTS

| | | | |
|---|---|---|---|
| 213925 | 9/1987 | Japan | 219/68 |
| 598719 | 3/1978 | U.S.S.R. | 219/69.16 |
| 763058 | 9/1980 | U.S.S.R. | 219/69.16 |

Primary Examiner—Philip H. Leung
Assistant Examiner—Geoffrey S. Evans

[57] ABSTRACT

A portable electrode arc cutting tool 11 for cutting internal and external precision notches in a work surface in which the tool is releasably attachable to the work surface and a calibrated feed control (14,112,185) is used to bring a surface configured electrode member (68,101,173) into close proximity to the work surface. Thereafter, upon the application of arc discharges of electrical current between the electrode member and the work surface and use of a cooling and flushing fluid, the electrode member cuts a precision depth notch in the work surface in an embodiment for internal use within pipe. The tool includes releasable attachment means (12,91,141) for stabilizing the tool within the bore of the pipe. In a tool used for external cutting of notches, the tool is releasably attached to an outer work surface.

19 Claims, 5 Drawing Sheets

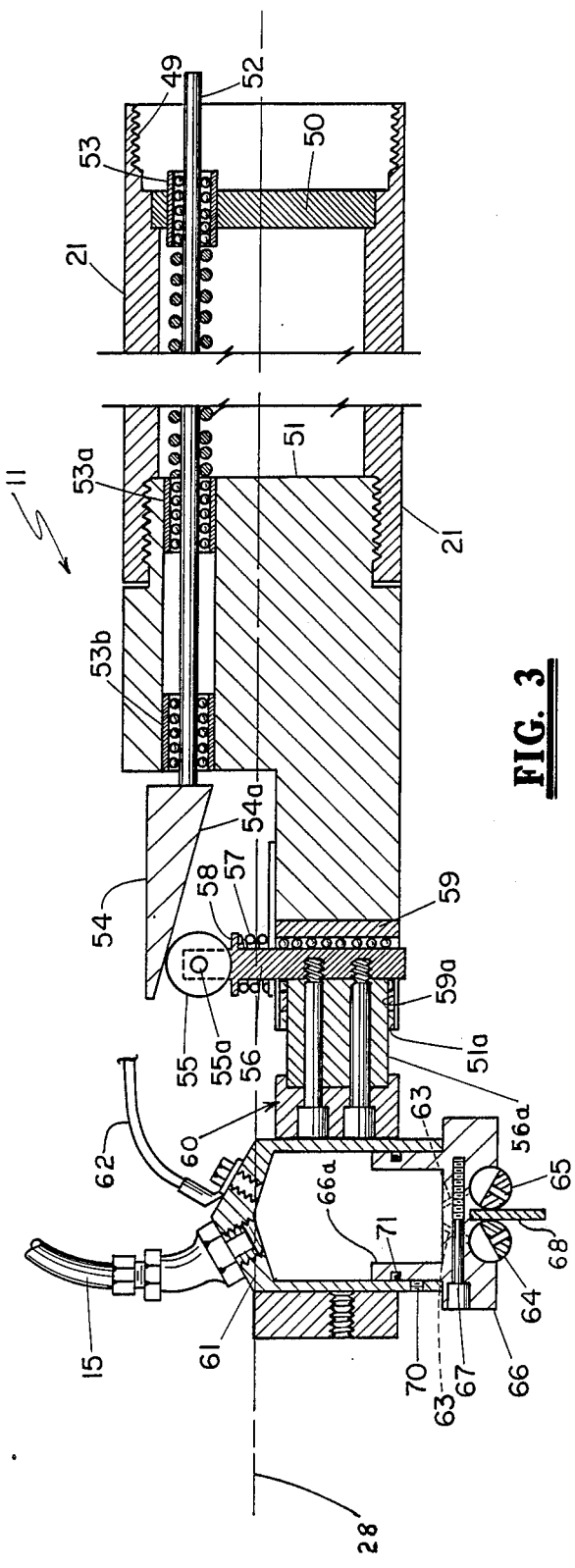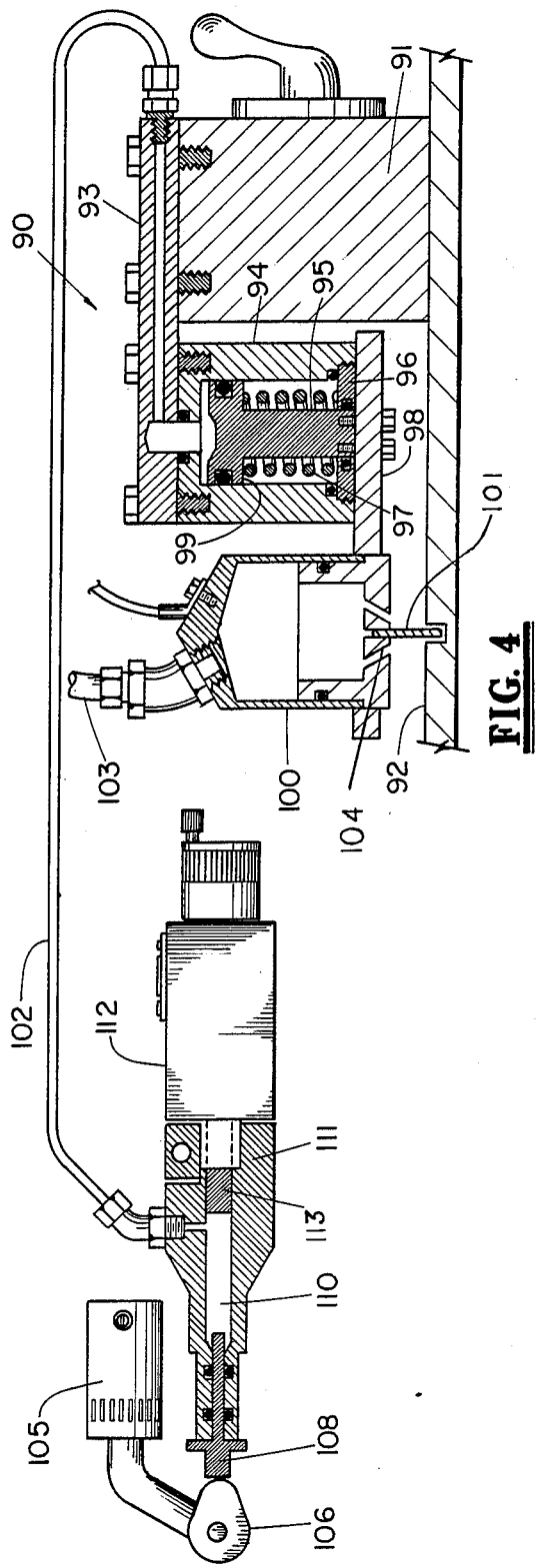

APPARATUS FOR CUTTING PRECISION NOTCHES IN WORK SURFACES

FIELD OF THE INVENTION

The present invention relates to tools for utilizing an electrode arc for cutting a precision notch in a work surface such as the surface of a tubular pipe and more particularly, to a portable tool for cutting internal precision notches in a pipe as well as being a portable arc cutting tool for cutting external precision notches on a work surface.

BACKGROUND OF THE PRESENT INVENTION

Electric discharge machines which utilize electrodes and electrical current for cutting calibration precision notches into hard metals are well known. The commercially available equipment, however, involves an expensively constructed non-portable apparatus which utilizes a cantilevered probe where an electrode is mounted on the end of the probe. A fixture holds a tubular pipe section. The electrode is movable by the fixture to bring the electrode into proximity with the inner wall of a pipe or other work material so that an electrical arc does a cutting operation. Thereafter, only the electrode is moved during the cutting of a notch and the pipe or work material remains stationary. The electrical current for the arc is applied via the electrode and the pipe.

This equipment and process as described above can be used to produce what is known as an API (American Petroleum Institute) notch in tubular pipe where the pipe is used in drilling and oil field use. The notch in the pipe is a standard notch with precise measurements so that the notch can be used to calibrate the measurements of an electromagnetic inspection device or a sonic inspection device. The purpose of the notch is to provide a measured or known reference loss of wall thickness value in the pipe wall for the testing equipment. Thus, when the testing equipment is utilized to inspect the wall of the pipe, the measurements of wall thickness or wall integrity obtained by the equipment can be calibrated with respect to the measured loss of wall thickness caused by the notch. For example, it is typical to cut an external notch in a pipe wall with a saw blade to a depth equal to 5% of the wall thickness of the pipe. The depth of the notch and the wall thickness of a pipe, of course, can be measured. Thereafter the measurement equipment for wall thickness can detect the notch and should give a measurement relative to the known decrease in wall thickness of 5%. This relative measurement value can be used for a sensitivity adjustment with respect to the equipment so that the subsequent measurements by the equipment are, in effect, calibrated to a known reference on the pipe itself.

While, heretofore, the API standards for calibration have indicated that there should be internal notches within the bore of the pipe as well as external notches for calibration, the method presently used to obtain an internal notch is to cut a pipe into short sections, of say, eight feet in length from a string of pipe; send the sections off to a location where an internal notch cutting apparatus is located; and then cut notches in each section. After the notches are cut in each section, the cut sections of pipe are reassembled by welding for inspection calibration purposes. Obviously, the entire process involved to form internal notches in this manner is expensive and considerable care and expertise is required for the reconstruction consistent with current inspection techniques.

There is also a problem in the fact that the type of notches required for calibration should have different orientations, i.e., be longitudinal to the length of the pipe, transverse to the length of the pipe, and at an angle or angles with respect to the longitudinal axis of the pipe. The need for transverse and angular cuts in outer pipe surfaces cannot be easily solved with saw blades which are not easily adaptable to making cuts of uniform depth in these directions and precision internal angular notches cannot be cut with saw blades by contemporary methods and apparatus.

THE PRESENT INVENTION

In one form of the present invention, a portable notch cutting tool, is adapted to be received within the bore of a joint of pipe which is selected from the joints of pipe utilized to form a string of pipe. The bore can extend over a wide range of bore sizes or diameter and weight of pipe (wall thickness). The notch cutting tool is actuatable to releasably support and attach the tool within the bore of a piece of pipe so that the position of the tool is fixed relative to the wall surface defining the bore of the pipe. A calibrated cutter actuator comprising a micrometer is utilized to move a cutting arc electrode member into engaging contact with the inner wall of the pipe for positioning the electrode member evenly on the pipe surface throughout the full extent of the electrode. The cutting edge of the electrode member is configured to correspond to the curvature of the surface of the pipe whether it be located transverse to the axis of the pipe, or at an angle to the axis of the pipe. The electrode member is configured with a flat cutting edge if it is disposed to extend longitudinally in the lengthwise direction of the pipe. The electrode member extends over a distance equal to the length of the notch to be formed (usually one inch) and is constructed of a carbon material, primarily graphite. For a notching operation, it is retracted from the pipe surface to provide an electrode gap so that when a voltage pulse is applied and an arc discharge of electrical current occurs between the electrode member and the metal pipe member, the arc discharge of the electrode member will produce a groove or notch of precise configuration in the wall of the pipe member. The depth of the notch is controlled by moving the electrode member in a direction normal to the pipe surface with a calibrated feed control device as arc discharges are repeatedly generated. The calibrated feed control device is located externally of the pipe to be of easy access to the operator and is controllable in a manner to maintain an appropriate electrode gap with the pipe surface whereby a precise depth of the notch in the pipe member can be obtained. During the arc discharge, a high dielectric, electrically non-conductive fluid is provided to immerse both the electrode member and the portion of the metal in the pipe member where the notch is being formed to flush residue material from the notch as it is being formed. Upon obtaining the proper depth of the notch with the electrode member, the calibrated feed control is reversed to retract the electrode member from the inner wall of the pipe and the tool is released from the interior wall of the pipe member so that it may be removed from the interior of the pipe member.

In another form of apparatus of the present invention, a portable tool is attachable to the exterior surface or interior surface of a pipe member or other work surface by a suitable attaching means such as a releasable magnet. An electrode member on the tool is adapted to be disposed in a proper complementary surface relationship to the exterior wall of the pipe or other work surface. The electrode member is configured to the curvature or surface plane of the work surface to be notched and operates in a similar manner as described for the first form of the invention in that, after the tool is attached to the work surface, a micrometer or calibration feed control device is actuated to move the electrode member into engagement throughout its length with the wall of the pipe or work surface to a zero or contact position. The electrode member is then retracted by the micrometer to provide an electrode gap with the work surface which is suitable for an arc discharge. Thereafter, the calibration feed control device can be actuated to move the electrode member when the current pulses are applied to form a precise depth of the notch while applying the immersion fluid and the electrical current necessary for the arc cutting process.

In a still further form of the invention, an alignment block functions as a heavy weight for supporting and maintaining the cutting tool in correct position for forming a precision notch in the internal surface of a tubular member or in an external work surface. The slave cylinder of a hydraulic control system is supported at one end of the alignment block. A probe supports the cutting electrode member and is mounted on a support arm connected to the piston of the slave cylinder. The probe is adapted for movement towards or away from the surface to be notched in relation to the piston movement. The slave cylinder and piston therein are responsive to the actuation of a master cylinder, the cylinder chamber of which receives the spindle of a micrometer. The volume and pressure of hydraulic fluid in the master cylinder are adjusted by axial movement of the micrometer spindle and hydraulically control the slave cylinder and positioning of the probe relative to the work surface. Pulsed electrical energy to the electrode member is provided to apply repeated arc discharges of electrical current to the work surface for forming a notch while flushing fluid is continually supplied to cool the electrode member and to flush residue material from the notch during a forming operation.

The external notch forming device, as can be appreciated, can have a variety of configurations with respect to portability in that it need only be adaptable to attach to the work surface in some manner.

BRIEF DESCRIPTION OF THE DRAWINGS

FIG. 2 and FIG. 3 are side by side lengthwise views in partial cross-section of a tool embodiment of one form of the present invention;

FIG. 4 is a view in partial cross-section of a tool embodiment of another form of the present invention;

DESCRIPTION OF THE PRESENT INVENTION

Figure 1:
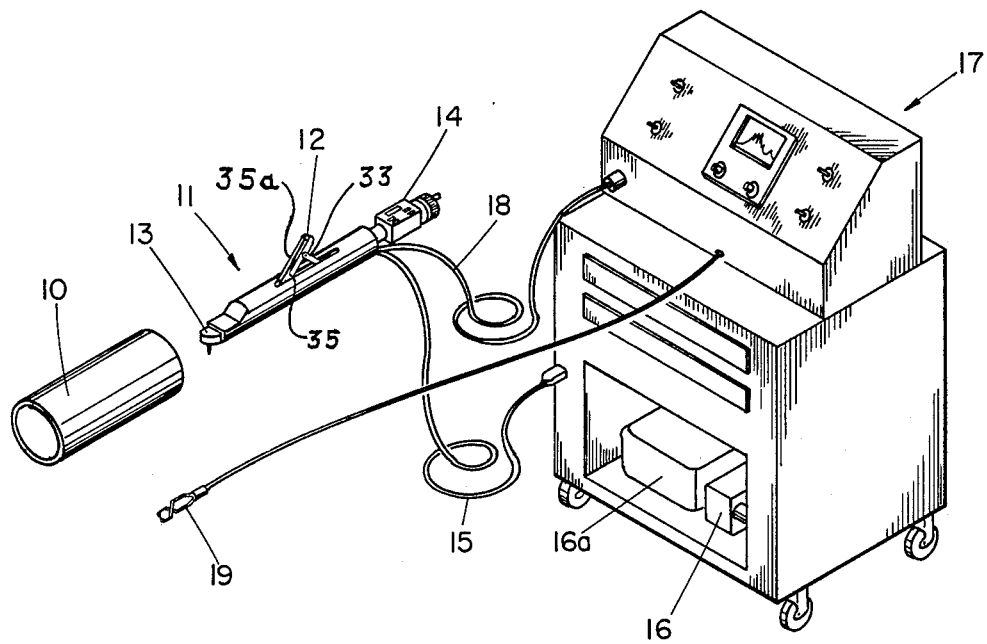
FIG. 1 illustrates an overall organization of components embodying one form of the present invention.
Figure 2:
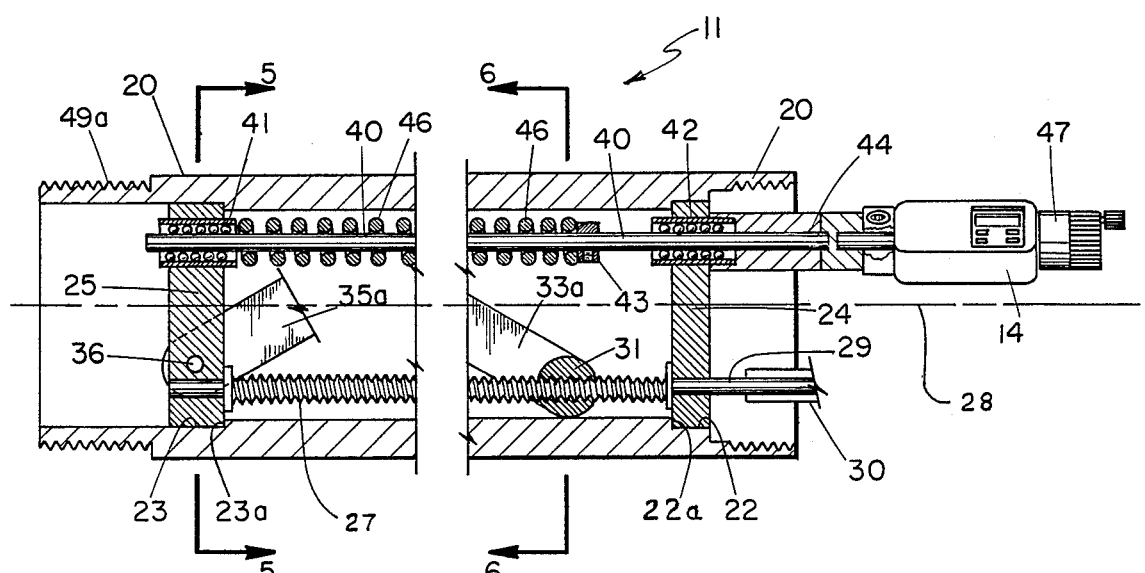

Referring to FIG. 1, a tubular pipe member 10 (work surface) in which a notch is desired is supported (not shown) in a conventional manner. An elongate notching tool 11, which is sized to be received in an open end of the pipe member 10, includes an articulated arm system 12 for releasably attaching or securing the tool 11 in a fixed position in the pipe member 10. At one end of the tool 11 is an electrode means 13 and at the other end of the tool is a micrometer 14. As will hereinafter be described, the electrode means 13 is vertically or transversely movable relative to the longitudinal axis of the tool 11 in response to the hand operated micrometer 14. The micrometer 14 is used to move the electrode means 13 a precise distance or depth relative to the wall of the pipe member 10 to cut a notch in the pipe member where the notch must be of precise depth and dimensions. A source of cooling fluid is provided to the electrode means 13 by a hose 15 and a pump 16 connected to a reservoir 16a containing a high dielectric electrically non-conductive cooling fluid. An electrical power supply 17 is connected by an electrical conductor means 18 to the electrode means 13 and a conductor means 19 is attachable to the pipe 10 for completing an electrical current path.

In operation, the tool 11 is inserted into the open end of the pipe member 10 and the articulated arm system 12 is actuated to attach or secure the tool 11 in the bore of the pipe member. The micrometer 14 is used to position an electrode in the electrode means 13 into contact with the inner wall of the pipe 10 for initial positioning and then to retract the electrode a predetermined distance from the inner wall of the pipe 10 to establish an electrode gap with respect to the pipe 10. The power supply 17 and the pump 16 are actuated to supply electrical power and cooling fluid to the electrode means 13. The micrometer 14 is then used to move the electrode means 13 relative to the wall of the pipe member while maintaining an appropriate electrode gap for forming a notch to the depth desired.

Figure 5:
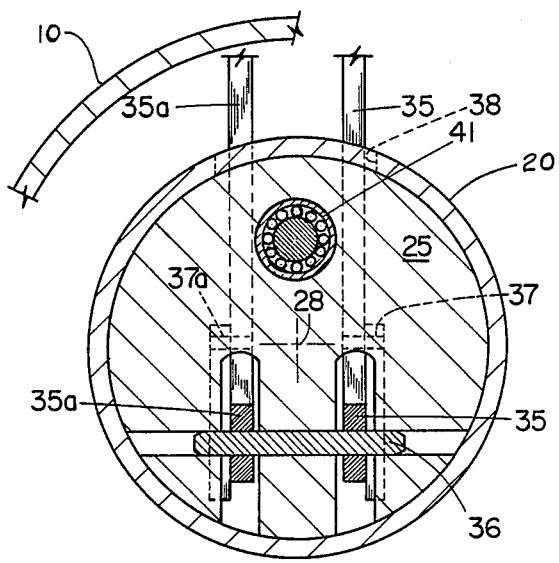
FIG. 5 is a view in cross-section taken along line 5—5 of FIG. 2.
Figure 6:
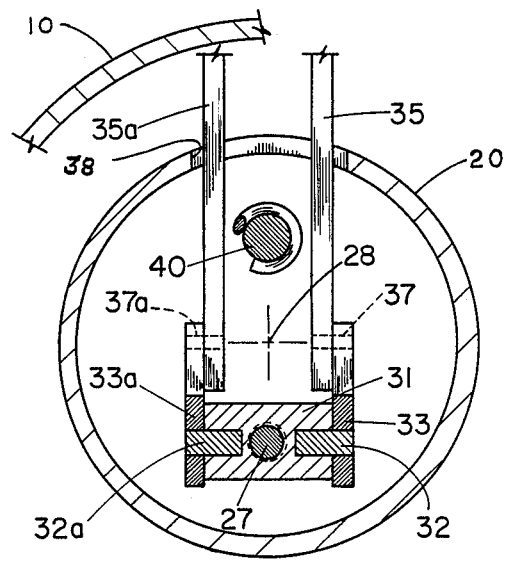
FIG. 6 is a view in cross-section taken along line 6—6 of FIG. 2.

In FIGS. 2, 3, 5 and 6, the tool 11 is illustrated in partial longitudinal cross-section. The tool 11 has threadedly interconnected tubular housings 20 and 21. The tubular housing 20 has internal spaced apart annular recessed portions 22, 23 extending from its respective ends and which respectively receive cylindrically shaped bulkhead members 24, 25. The bulkhead members 24, 25 engage stop shoulders 22a, 23a in the housing 20. A threaded rod or lead screw member 27 extends longitudinally of the housing 20 and parallel to a central axis 28 of the housing 20 and is rotatably journalled in the bulkhead members 24, 25. One end portion 29 of the rod 27 extends outwardly from the bulkhead 24 and is fitted with a driver connection 30 which permits the application of axial rotative force to the rod 27. A traveling nut 31 is threadedly received on the rod 27 and located thereon between the bulkheads 24, 25. As best seen in FIG. 6, the nut 31 is pivotally connected by pivot pins 32, 32a to a spaced apart pair of elongated clamp arms 33, 33a. As best seen in FIG. 5, the ends of a pair of spaced apart, elongated clamp arms 35, 35a are pivotally connected by a pivot pin 36 to the bulkhead 25. The other ends of the clamp arms 33, 33a are pivotally connected to the clamp arms 35, 35a respectively by pivot pins 37, 37a at an intermediate length position along the clamp arms 35, 35a (see also FIG. 1). The unattached free ends of the clamp arms 35, 35a extend outwardly through an elongate opening 38 in the housing 20 which is formed in the lengthwise direction thereof and are adapted to be positioned to engage the inner wall of a pipe member. By rotating the rod 27 the arms 33, 33a, 35, 35a are arranged to move in a direction transverse to the longitudinal axis 28 of the housing 20 by pivotal movement about their pivotal connections with the bulkhead 25, traveling nut 31, and with each other as the nut 31 is moved along the screw 27. Accordingly, the free ends of the clamp arms 35, 35a external to the housing 20 are moved toward or away from the housing 20 and conversely towards or away from the inner surface of the pipe 10.

Disposed in a vertically displaced location from the rod 27 and in parallel relation thereto is a push rod 40, the push rod 40 being slidably mounted in bearing journals 41, 42 for longitudinal sliding movement. The bearing journals 41, 42 are mounted in the bulkheads 25, 24 respectively and have their longitudinal axes in parallel co-planar alignment with the central axis 28 of housing 20 and the axis of the rod 27. Between the bulkhead 25 and a stop collar 43 on the push rod 40 is a spring member 46 which is sleeved about the rod 40 with one end abutting the bearing journal 41 for resiliently urging the push rod 40 and the stop collar 43 to a location where the stop collar 43 abuts the bulkhead 24. The push rod 40 is connected by a tubular extension collar 44 to the movable spindle of a micrometer means 14 in coaxial relation thereto. The micrometer means 14 is conventional and has a knob 47 for actuating the spindle of the micrometer means 14 for producing precise controlled longitudinal displacement of the push rod 40 against the force of the spring member 46.

The tool 11 further includes a tubular electrode housing 21 which is connected to the actuator housing 20 by a threaded connection 49, 49a. If desired, there can be intermediate extender housings for additional length. In the electrode housing 21 are spaced apart bulkhead members 50, 51 which slidably support a push rod 52 in a journal 53 in the bulkhead 50, and axially aligned journals 53a, 53b in the bulkhead 51. The push rod 52 is arranged axially aligned with the rod 40 in the housing 20 so that adjacent facing ends of the rods 40, 52 can contact one another. At the other end of the push rod 52 is mounted a tapered cam member 54 which is adapted to provide a cam action with respect to a roller 55 by virtue of a tapered surface 54a of the cam 54 which is movable along a longitudinal axis parallel to the axis of the pipe 10. The roller 55 is rotatively mounted on a shaft 56 by a pin 55a in the shaft 56. The shaft 56 is of rectangular or square cross section and is slidably and nonrotatively mounted on a linear bearing 59 for transverse radial movement relative to the bulkhead 51 and the axis of the pipe 10. A spring member 57 sleeved about the shaft 56 between one end of the bearing 59 mounted in the bulkhead 51 and a stop 58 on the shaft 56 resiliently urges the roller 55 into sliding or rolling contact with the tapered surface 54a of the cam member 54. When the tool 11 is assembled, longitudinal displacement of the push rod 52 produced by the micrometer will produce a cam action between the surface 54a and roller 55 to vertically displace the shaft 56. The micrometer 45 is calibrated to reflect the vertical axial displacement of the shaft 56 in appropriate units.

Attached to the shaft 56 by means of radial arm 56a appended thereto is an electrically insulated tool vise 60 which releasably holds a tubular metallic housing 61. The arm 56a extends through slotted openings 59a, 51a in bearing 59 and the end of the bulkhead 51, respectively. The housing 61 has attachments at one end to an electrical cable 62 and to cooling fluid supply hose 15. At the other end of the housing 61 is an electrode holder 66 which has cam or jaw members 64, 65 at one end for releasably gripping an elongated electrode 68. A cylindrical extension 66a of holder 66 is telescoped inside the housing 61 and secured therein by a set screw 70. An O-ring 71 about extension 66a establishes a fluid tight seal with housing 66. The cam members 64, 65 are moved toward and away from one another by rotation where the rotation is obtained through use of a threaded member 67. The cam members 64, 65 are ported to couple with fluid passages 63 in electrode holder 66 and direct fluid from the housing 61 to the electrode 68 and to a work surface.

The coolant fluid delivered to both sides of the electrode 68 serves to cool the electrode and at the same time flush away the residue material produced by the forming process. Such residue consists of particles of burned metal from the pipe and graphite from the electrode. Continuous flushing of residue during cutting prevents a buildup of residue material which could short out the electrode and stop any further electrical arcing.

In the foregoing described embodiment, the tool is used for forming an internal notch. The notch can be transverse, angular or parallel to the axis of a pipe member depending upon the angular disposition of the housing 61 relative to the tool vise 60. By changing the rotative position of the housing 61 in the vise 60 the elongated electrode 68 can be located transverse, angularly or in line with respect to a longitudinal axis of the work piece.

In FIG. 4, a second embodiment of the present invention is illustrated wherein the tool can be attached to the exterior of a pipe or any other work surface. In FIG. 4, the tool 90 includes a base member 91 adapted to complementarily engage a work surface 92. In the base member 91 is a magnetic means (not shown) which can be selectively actuated for attaching the base member 91 to a metal work surface. The base member 91 supports a mounting base 93 which projects outwardly over the work surface 92. Attached to the base 93 is a cylinder housing 94 in which a piston 95 is slidably received. A spring member 97 which seats against an annular retainer 96 threaded into one end of the cylinder 94 and abuts an annular shoulder 99 of piston 95, urges the piston 95 to an upper position in the cylinder housing 94 and the piston 95 is movable in a direction normal to the work surface 92 with one end extending through the opening of the annular retainer member 96. An electrically insulated mounting plate 98 is attached to the end of the piston 95 external of the housing 94 and supports an electrode housing 100 similar to housing 61 as described heretofore. The electrode 101 supported in the electrode housing 100 is moved toward and away from the work surface by hydraulic pressure supplied to the hydraulic cylinder housing 94 through a hose 102 which urges the piston 95 and mounting plate 98 towards the work surface 92. The electrode 101 is retained in the electrode means by suitable jaw means 104 corresponding to cam members 64, 65 of FIG. 3 and cooling fluid has access to the electrode 101. Cooling fluid is supplied to the electrode means 100 by a hose means 103, corresponding to hose 15 in a coolant system as shown in FIG. 1.

As shown in FIG. 4, an electrical motor 105 drives a cam 106 which reciprocates a spring biased plunger 108 in a fluid chamber 110 in a master cylinder housing 111. The reciprocating motion of the plunger 108 pressurizes the fluid in chamber 110. Thus, for a given volume in the fluid chamber 110 there will be a related pressure in the hose 102 and the hydraulic system. The volume of the fluid chamber 110 may be changed by a micrometer displacement rod or spindle 113 on a micrometer 112 which projects axially into the chamber 110 in fluid tight sealing relation therewith. Thus, by actuating the micrometer 112, an increase of hydraulic pressure in the chamber 110 is communicated to the cylinder 94 such that the vertical displacement of the piston 95 can be obtained by adjustment of hydraulic pressure supplied to the piston 95. The vertical adjustment can be very precisely controlled by the micrometer 112 to position the electrode 101 closely adjacent the pipe surface to establish an electrode gap which is appropriate for creating an arc discharge of electrical current between the electrode and the pipe where a predetermined electrical voltage is applied to the electrode. Preferably, voltage pulses are delivered to the electrode and repeated arc discharges are produced. By the micrometer control, the electrode is continually fed toward the pipe surface until a precise depth of notch is obtained.

Figure 7A:
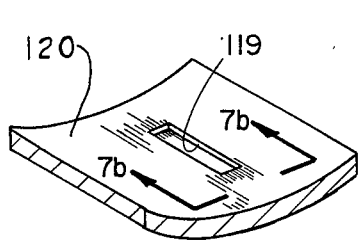
FIGS. 7a and 7b, 8a and 8b, 9a and 9b are respectively three different notch configurations for an inner wall of a pipe member.
Figure 7B:
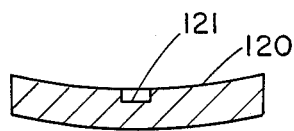

To illustrate the type of notches and electrodes utilized, as shown in FIGS. 7a and 7b a notch 119 is formed lengthwise in aligned parallel relation to the longitudinal axis of curvature of the inner pipe wall 120. The notch 119 is rectangular in shape and its bottom wall 121 can have a similar curvature to the curvature of the wall 120. Typically, the depth of the notch 119 is 5% of the wall thickness.

Figure 8A:
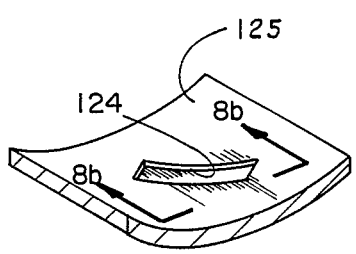
Figure 8B:
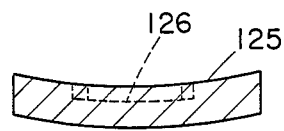

In FIGS. 8a and 8b, the notch 124 is formed at an angle of 45° relative to the longitudinal axis 123 of curvature of the inner pipe wall 125. The notch 124 has a bottom wall 126 at a uniform depth from the surface of the inner pipe wall 125. The electrode for forming the notch 124 is of a configuration which matches the length, width and bottom wall curvature of the notch.

Figure 9A:
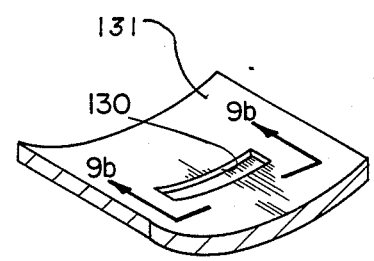
Figure 9B:
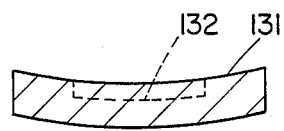

In FIGS. 9a and 9b, the notch 130 is transverse to the axis of curvature of the inner pipe wall 131. The notch 130 has a bottom wall 132 at a uniform depth from the surface of the inner pipe wall 131 and is formed by an electrode of conforming configuration to match the length, width and bottom wall curvature of the notch.

With the present invention, the tool can be used to cut successive notches at different angular relationships to an axis of the work surface. This can be done by repositioning the tool or repositioning the electrode member. Also if desired, a tool can be attached to the threaded end of a pipe member but this obviously requires an inventory of cap members.

There is shown in FIGS. 10 through 14, a further and preferred embodiment of the invention which is also suited for forming precision notches in either the interior or exterior walls of a pipe. The tool comprises an elongate heavy steel alignment block 141 which is sufficiently small in radial cross section to fit entirely within the bore of a pipe to be notched. The alignment block 141 is provided with two long tapered planar surfaces 143, 144 which extend the length of one of the long faces of the block and are convergent inwardly to form a saddle. The surfaces 143 and 144 on the block adapt the block 141 to be seated stationary atop the external surface of a pipe, if the tool is to be used for cutting a precision notch in its external surface.

At one end, the alignment block 141 is provided with a transverse groove or mortise 145 which is adapted to receive a tenon 146 formed on one end of a cylinder housing 148. The tenon 146 of the cylinder housing 148 may be adjustably positioned along the groove 145 by means of a pair of set screws 151, 152. The screws 151, 152 are threaded into holes formed in the alignment block and opening into the groove 145.

Figure 12:
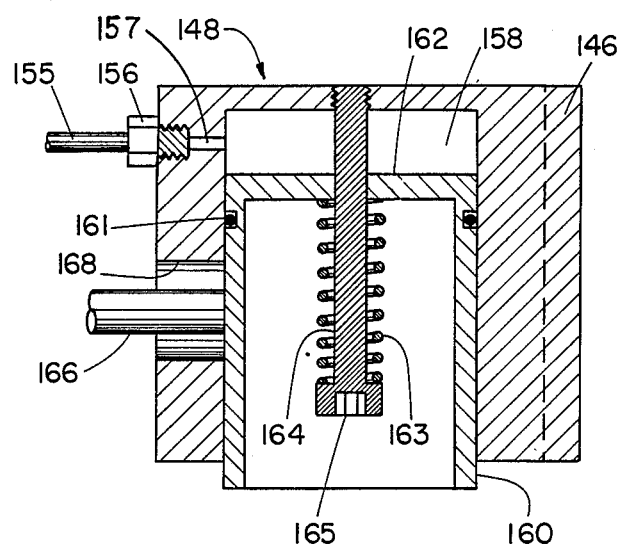
FIG. 12 is a cross-section of the slave cylinder used in the embodiment of FIG. 10.

The cylinder housing 148 defines a slave cylinder for a hydraulic control system which includes a master cylinder 153. The slave cylinder and master cylinder 153 are hydraulically connected by a hose 155. The hose 155 is connected to a fitting 156 on the cylinder housing 148 which communicates with a fluid passage 157 leading to one end of a slave cylinder chamber 158. A hollow piston 160 is mounted in the chamber 158 and is provided with a peripheral piston ring seal 161 located near a closed end of the piston which includes the pressure receiving face 162. By the communication of hydraulic pressure through the hose 155 to the pressure face 162 the piston 160 is movable downwardly as shown in FIG. 12. Piston 160 is continually urged upward by a spring 163 which is sleeved about a spring guide 164 anchored coaxially of the housing 148 at one end thereof and extending through the face of piston 160. One end of spring 163 abuts the inner face of the closed end of piston 160 and its other end abuts the shoulder of the flanged end 165 of spring guide 164. The piston 160 is provided with a laterally extending plastic or electrically non-conductive arm 166 which extends through an accommodating slot 168 formed in the cylinder housing 148. The slot 168 is of an extent which allows movement of the piston arm 166 relative to the slot as the piston 160 is moved in the cylinder chamber 158.

Figure 13:
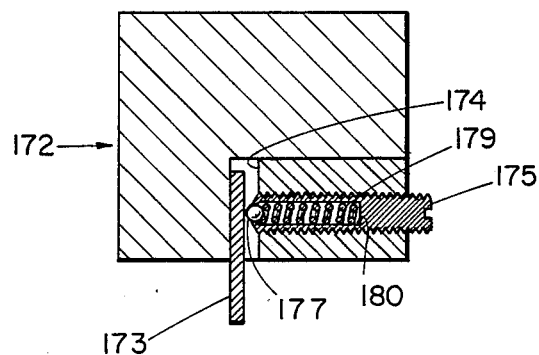
FIG. 13 is an enlarged fragmentary view of the electrode-carrying probe of the invention embodiment of FIG. 10.
Figure 14:
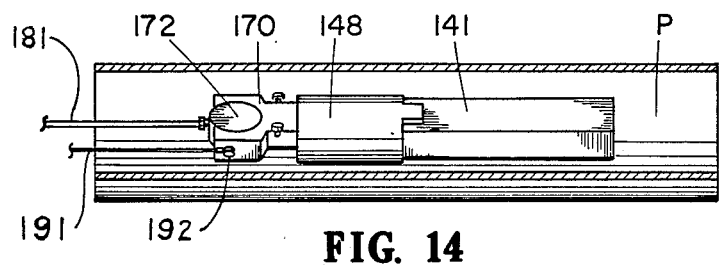
FIG. 14 is a view of the embodiment of FIG. 10 installed in a cut-away section of pipe to be notched.

Fitted to the end of the plastic piston arm 166 is a yoke 170 in which is supported a probe 172 carrying a graphite electrode 173. The probe 172 is provided with a diametrical slot 174 for receiving the graphite electrode 173 which is formed as a blade with a cutting edge having width and length dimensions corresponding to those of the notch which it is intended to cut. As best shown in FIG. 13, the electrode 173 is clamped in place in the slot 174 by set screws 175 having spring-loaded ball detents 177 in the ends of the screws and each urged outwardly by a coiled spring 179 seated in an axial bore 180. Position of the electrode 173 is adjustable in the slot 174 by contacting the electrode with the work surface throughout the length of the electrode cutting edge to insure that the cutting edge is uniformly spaced from the surface of the pipe when an electrode gap is established preparatory to forming a notch.

The probe 172 is also provided with nozzles 176 for delivering a high dielectric electrically non-conductive flushing fluid to the area of the pipe surface on either side of the electrode 173 when it is positioned for a notching operation. For this purpose, the body of the probe is provided with a port and a connecting fluid passage 178 which communicates with the nozzles 176. A hose fitting is installed in the port for connection with a hose 181 which is adapted to deliver flushing fluid from a flushing system including a fluid reservoir and supply pump, such as described in the first embodiment of the invention.

The master cylinder 153 includes a cylindrical body 182 with a central axial chamber 183 formed by a circular bore 187 extending through the cylindrical body 182 from one end to the other. At one end, a micrometer 185 is attached to the cylinder body 182 with its micrometer spindle 186 fitting in the circular bore 187 of the chamber 183 and adapted for axial movement therein. A free slidable piston 184 is disposed in the bore 187 in abutting engagement with the end of the spindle 186. A fluid tight seal is formed about the piston 184 by O-rings 188 seated in accommodating annular grooves formed in the cylindrical surface of the piston 184. The cylinder body 182 is also provided with a fill port 189 and fitting therefor by means of which hydraulic fluid may be supplied to fill the hydraulic system comprising the master cylinder 153, hose 155, and the slave cylinder 158.

Accordingly, by micrometric adjustment of the spindle 186 to move the spindle and piston 184 further into the cylinder chamber 183, there is an associated increase in hydraulic pressure in the system which is communicated to the pressure receiving face 163 of the piston 160 in the slave cylinder 158. Accordingly, there is a movement of hydraulic fluid from the master cylinder to the slave cylinder and a corresponding movement of the piston 160 which moves the probe 172 toward the surface of the pipe or other work surface which is to be rotated.

The micrometer 185 is a commercially available precision instrument preferably provided with a liquid crystal display which is readable in ten-thousandths of an inch of movement of the micrometer spindle 186. The micrometer can therefore be used as a calibrated precision feed control for the probe 172.

Figure 10:
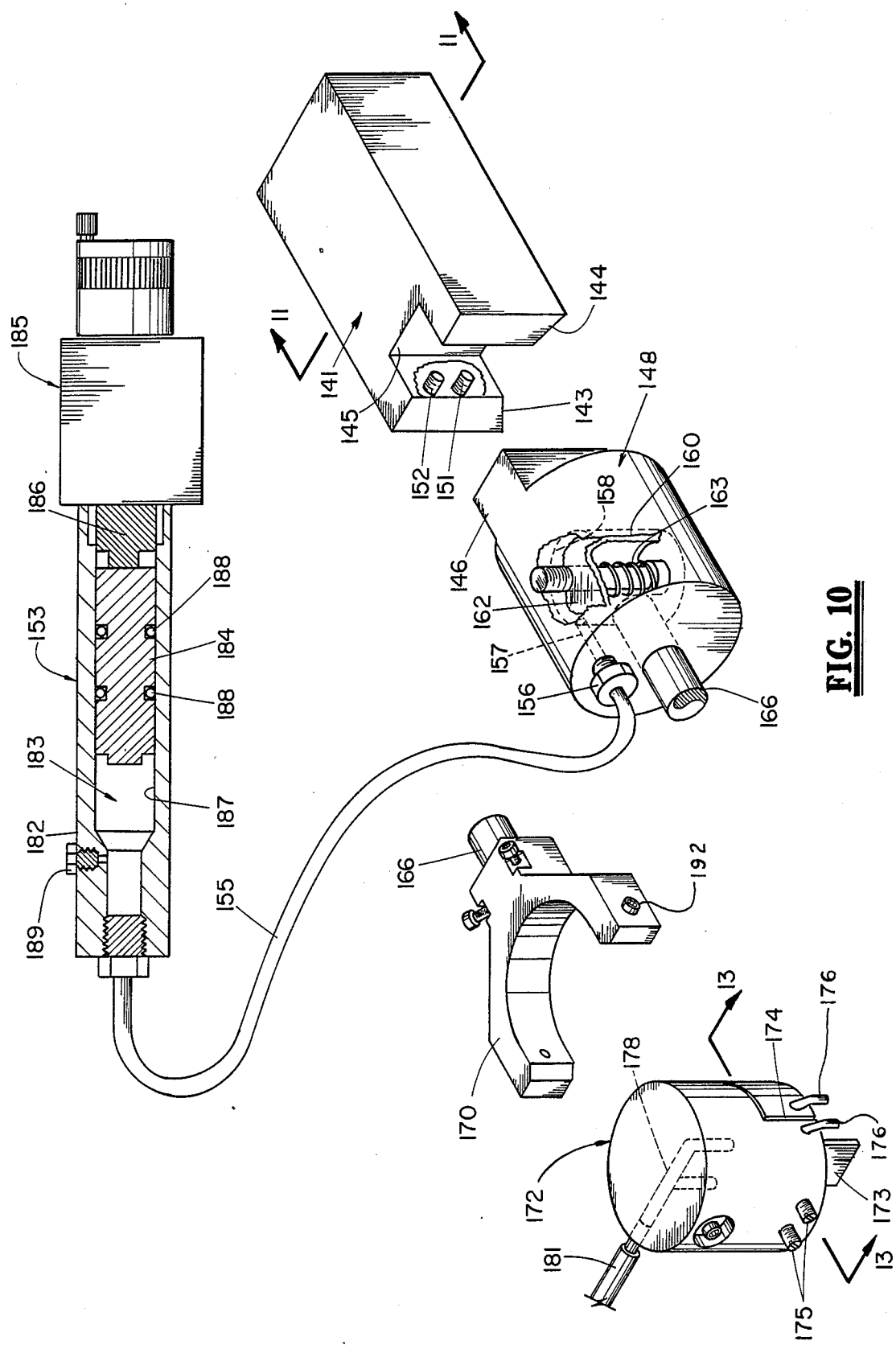
FIG. 10 is an exploded view in perspective of a further embodiment of the invention.
Figure 11:
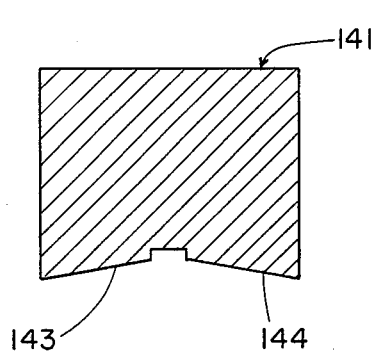
FIG. 11 is a cross-section of the alignment block used in the embodiment of FIG. 10.

In a notch cutting operation, an electrode 173 configured to the desired shape of the notch to be formed is positioned adjacent the pipe surface at a distance which provides an appropriate electrode gap for arcing. In FIG. 13, the embodiment of FIG. 10 is shown installed in a pipe section P, which is cut-away for illustration purposes. Electrical power is supplied to the electrode by a conductor 191 which connects directly to the body of probe 172 as by one of the screws 192 which clamps the probe 172 in the yoke 170 and makes connection with the body of probe 172. The power supply (not shown) is preferably a logic power supply for delivering voltage pulses of predetermined magnitude, duration and interval to the electrode 173 whereby arc discharges of electrical current may be delivered to the surface of the pipe for cutting.

It will therefore be seen that in the precision notch cutting tool shown in FIGS. 4, 10 and 13, a micrometer spindle actuated by appropriate micrometer means operates a master cylinder which hydraulically controls a slave cylinder. The slave cylinder and its piston as controlled by the master cylinder provide the mechanical means for precision control of the movement of the probe and cutting electrode, and therefore the depth of the cut.

In the embodiment of FIG. 13, the alignment block 141, which rigidly supports the slave cylinder, is simply a dead weight that lays on the internal diameter surface of the pipe when an internal notch is desired, or it may be laid or strapped to the external surface of the pipe when an external notch is desired. The extension arm 166 of the slave piston 160 is of an insulating plastic so that the entire probe is electrically insulated from the slave cylinder and the pipe body by means of the plastic extension.

It is also to be understood that an electrode clamping means which employs spring-loaded ball detents as shown in FIG. 13 in the preferred embodiment of the invention could be used in lieu of the clamping mechanism with jaws 64, 65 in the embodiment of FIG. 3 and the jaw means 104 in the embodiment of FIG. 4.

It will be apparent to those skilled in the art that various changes may be made in the invention without departing from the spirit and scope thereof and therefore the invention is not limited by that which is enclosed in the drawings and specifications but only as indicated in the appended claims.

I claim:

1. Apparatus for producing a precision cut notch in a metal work surface having a defined axis, said apparatus comprising a portable cutting electrode tool having an electrode arc member and housing means for supporting said electrode arc member therein;

means for movably supporting said housing means on said electrode tool for controlled movement along an axis normal to said work surface, said electrode arc member being adapted for disposal proximate to the work surface in which a notch is to be made where the electrode arc member is elongated along an axis with a cutting edge and configuration to produce a notch with a defined side, end and bottom walls in said work surface, said means for supporting the electrode arc member including means for adjustably mounting said electrode arc member whereby said arc member can be oriented with its elongate axis substantially parallel to the work surface and in a selected angular relationship to said axis of the work surface throughout a predetermined range of angular relationships;

means for moving the electrode arc member toward and away from the work surface whereby the electrode arc member may be positioned for producing an electric arc discharge between said arc member and the work surface to be notched upon the application of an electrical voltage to said electrode arc member;

means for applying an electrical voltage to the electrode arc member for producing arc discharges of electrical current between the electrode arc member and the work surface for producing an electrical arc cutting effect on said work surface;

means for supplying an electrically non-conductive immersion fluid over the area to be notched during the cutting of said surface for cooling said electrode arc member and flushing residue material produced by said arc discharges from the notched area; and means for moving said electrode arc member relative to said work surface while maintaining production of said arc discharges to produce desired dimensions of depth and the side and end walls of the notch in the work surface.

2. The apparatus as set forth in claim 1 wherein said electrode arc member has a bottom surface complementarily configured to the surface configuration of the wall surface adjacent to which it is operatively positioned.

3. The apparatus as set forth in claim 1 wherein said means for moving the electrode arc member includes a hydraulic piston and cylinder.

4. The apparatus as set forth in claim 3 wherein said hydraulic piston and cylinder are controlled and responsive to said measurement means and said measurement means includes a micrometer.

5. An apparatus as set forth in claim 1 wherein said means for adjustably mounting said electrode arc member includes means for orientation of the electrode arc member with its elongate axis substantially parallel to the work surface and in a selected angular relationship to said axis of the work surface throughout a range of 360°.

6. Apparatus for producing a precision cut notch in a metal work surface of a tubular member, said apparatus comprising
   a portable cutting electrode tool having electrode arc means for providing electrical arc discharges, housing means for supporting the electrode arc means, said housing means being elongated along a lengthwise axis and sized for disposition into said tubular member where the inner wall of the tubular member is said work surface;
   means for movably supporting said housing means on said electrode tool for controlled movement along an axis normal to said work surface, said electrode arc means having an electrode arc member for disposal proximate to the work surface in which a notch is to be made where the electrode arc member is configured to produce a notch with a defined side, end and bottom walls in said work surface;
   means for moving the electrode arc means relative to said housing means and toward and away from the work surface whereby the electrode arc member may be positioned for producing an electric arc discharge between said arc member and the work surface to be notched upon the application of an electrical voltage to said electrode arc member;
   means for applying an electrical voltage to the electrode arc member for producing arc discharges of electrical current between the electrode arc member and the work surface for producing an electrical arc cutting effect on said work surface;
   means for supplying an electrically non-conductive immersion fluid over the area to be notched during the cutting of said surface for cooling said electrode arc member and flushing residue material produced by said arc discharges from the notched area;
   measurement means for moving said electrode arc member relative to said work surface while maintaining production of said arc discharges to produce desired dimensions of depth and the side and end walls of the notch in the work surface; and
   means for releasably attaching said housing means to said tubular member within the interior thereof, said attaching means including articulated arm means disposed along said lengthwise extending axis, and threaded means attached to said arm means for extending and retracting said arm means relative to said housing means to engage or disengage the inner wall of the tubular member.

7. The apparatus as set forth in claim 6 wherein said housing means is a tubular pipe.

8. The apparatus as set forth in claim 6 wherein said means for moving said electrode arc member includes a cam member movable in a direction parallel to said lengthwise extending axis and a cam follower movable in an axis normal to the wall portion of the work surface.

9. The apparatus as set forth in claim 8 wherein said measurement means is a micrometer.

10. Apparatus for producing a precision cut notch in a metal work surface, said apparatus comprising
    a portable cutting electrode tool attachable to a stationary work surface in which a cut is to be made where an elongated electrode arc member is configured to produce a notch with a defined side, end and bottom walls in a work surface and where said tool has a tubular housing means having a central axis;
    articulated arm members connected to said housing means and means for moving said arm members toward and away from said housing means and for diametrically attaching and releasing the housing means relative to a tubular work surface;
    a force rod member located in said housing means and means for moving said force rod member parallel to said central axis in measured increments of distance:
    an electrode arc member mounted relative to said housing means for movement toward and away from the work surface in a direction perpendicular to said central axis for bringing the arc member into contact with the work surface to be notched;
    coupling means for coupling and translating the said measured increments of distance into a measured movement of said electrode arc member;
    means for applying pulses of electrical current between the electrode arc member and the work surface together with a cooling fluid over the area to be notched for producing an electrical arc cutting effect; and
    means for moving said force rod member and said electrode arc member while arc discharges of electrical current and cooling fluid are applied.

11. The apparatus as set forth in claim 10 wherein said coupling means includes a cam and a cam follower.

12. The apparatus as set forth in claim 10 and further including means for adjusting the angle of said electrode arc member relative to said central axis.

13. Apparatus for producing a precision cut notch in a metal work surface, said apparatus comprising:
    an electrode arc member adapted to cut a precision notch in a work surface, said electrode arc member being configured to produce a correspondingly shaped notch in said work surface with precisely defined sides, end walls and a bottom wall;
    electrode support means supporting the electrode arc member in proximity to said work surface;
    control means for selectively moving the electrode arc member towards or away from the work surface whereby the arc member may be positioned for producing an electric arc discharge between said arc member and the work surface upon application of an electrical voltage to said arc member, said control means comprising a hydraulic system including a master cylinder and a slave cylinder with a slave piston supported therein, means for mounting said slave piston in said slave cylinder whereby the relative position of said slave piston in said slave cylinder is controlled by the application of hydraulic fluid and pressure to said slave cylinder;

an electrically insulating support arm rigidly connecting the electrode support means to said slave piston whereby said support arm and electrode support means are movable in correspondence with the movement of said piston;

an alignment block member;

means for adjustably supporting said slave cylinder on the alignment block member whereby said electrode support means and electrode may be positioned in proximity to said work surface and said slave piston is movable directly towards or away from said work surface;

means for adjusting the hydraulic fluid in said master cylinder whereby the communication of hydraulic pressure and fluid to said slave cylinder precisely controls the position of said slave piston and thereby said electrode arc member relative to said work surface;

means for applying an electrical voltage to the electrode arc member for producing arc discharges of electrical current between the electrode arc member and the work surface;

means for supplying a non-electrolytic fluid to the area of the work surface to be notched while said arc discharges are being produced to thereby flush residue material produced by said arc discharges from the notched area; and means for moving said electrode arc member towards said work surface while maintaining production of said arc discharges to produce a notch of desired dimensions in the work surface, said alignment block member, slave cylinder and electrode support means being of a size suitable for insertion into the bore of a tubular member to be notched by said apparatus.

14. An apparatus as set forth in claim 13 wherein said alignment block member is shaped with convergent planar surfaces for seating atop a tubular member whose exterior surface is to be notched by said apparatus.

15. An apparatus as set forth in claim 13 wherein said slave cylinder and master cylinder are connected in communication by means of flexible conduits.

16. Apparatus for producing a precision cut notch in a metal work surface, said apparatus comprising:

an electrode arc member adapted to cut a precision notch in a work surface, said electrode arc member being configured to produce a correspondingly shaped notch in said work surface with precisely defined sides, end walls and a bottom wall;

electrode support means supporting the electrode arc member in proximity to said work surface;

control means for selectively moving the electrode arc member towards or away from the work surface whereby the arc member may be positioned for producing an electric arc discharge between said arc member and the work surface upon application of an electrical voltage to said arc member, said control means comprising a hydraulic system including a master cylinder and a slave cylinder with a slave piston supported therein, means for mounting said slave piston in said slave cylinder whereby the relative position of said slave piston in said slave cylinder is controlled by the application of hydraulic fluid and pressure to said slave cylinder;

an electrically insulating support arm rigidly connecting the electrode support means to said slave piston whereby said support arm and electrode support means are movable in correspondence with the movement of said piston;

an alignment block member;

means for adjustably supporting said slave cylinder on the alignment block member whereby said electrode support means and electrode may be positioned in proximity to said work surface and said slave piston is movable directly towards or away from said work surface;

means for adjusting the hydraulic fluid in said master cylinder whereby the communication of hydraulic pressure and fluid to said slave cylinder precisely controls the position of said slave piston and thereby said electrode arc member relative to said work surface;

means for applying an electrical voltage to the electrode arc member for producing arc discharges of electrical current between the electrode arc member and the work surface;

means for supplying a non-electrolytic fluid to the area of the work surface to be notched while said arc discharges are being produced to thereby flush residue material produced by said arc discharges from the notched area; and means for moving said electrode arc member towards said work surface while maintaining production of said arc discharges to produce a notch of desired dimensions in the work surface, said electrode support means including spring-loaded detents engaging a side of said arc member for yieldably clamping said arc member whereby said arc member may be moved into engagement with said work surface to position said arc member in said support means whereby the cutting surface of the arc member will be uniformly spaced from the work surface when an electrode gap is established between the arc member and the work surface.

17. Apparatus for producing a precision cut notch in a metal work surface, said apparatus comprising:

an electrode arc member adapted to cut a precision notch in a work surface, said electrode arc member being configured to produce a correspondingly shaped notch in said work surface with precisely defined sides, end walls and a bottom wall;

electrode support means supporting the electrode arc member in proximity to said work surface;

control means for selectively moving the electrode arc member towards or away from the work surface whereby the arc member may be positioned for producing an electric arc discharge between said arc member and the work surface upon application of an electrical voltage to said arc member, said control means comprising a hydraulic system including a master cylinder and a slave cylinder with a slave piston supported therein, means for mounting said slave piston in said slave cylinder whereby the relative position of said slave piston in said slave cylinder is controlled by the application of hydraulic fluid and pressure to said slave cylinder;

an electrically insulating support arm rigidly connecting the electrode support means to said slave piston whereby said support arm and electrode support means are movable in correspondence with the movement of said piston;

an alignment block member;

means for adjustably supporting said slave cylinder on the alignment block member whereby said electrode support means and electrode may be positioned in proximity to said work surface and said slave piston is movable directly towards or away from said work surface;

means for adjusting the hydraulic fluid in said master cylinder whereby the communication of hydraulic pressure and fluid to said slave cylinder precisely controls the position of said slave piston and thereby said electrode arc member relative to said work surface;

means for applying an electrical voltage to the electrode arc member for producing arc discharges of electrical current between the electrode arc member and the work surface;

means for supplying a non-electrolytic fluid to the area of the work surface to be notched while said arc discharges are being produced to thereby flush residue material produced by said arc discharges from the notched area; and means for moving said electrode arc member towards said work surface while maintaining production of said arc discharges to produce a notch of desired dimensions in the work surface, said means for adjusting the pressure and volume of hydraulic fluid in the master cylinder including a master piston in said master cylinder and a micrometer mounted to said master cylinder with its spindle inserted into said master cylinder in abutting engagement with said master piston whereby axial extension or retraction of said spindle precisely controls the hydraulic pressure and fluid volumes in the master cylinder and said slave cylinder and thereby the movement of said slave piston in response thereto and the positioning of the electrode arc member relative to the work surface.

18. Apparatus for producing a precision cut notch in a metal work surface, said apparatus comprising:
an electrode arc member adapted to cut a precision notch in a work surface, said electrode arm member being configured to produce a correspondingly shaped notch in said work surface with precisely defined sides, end walls and a bottom wall;

electrode support means for supporting the electrode arc member in proximity to said work surface;

hydraulic control means for selectively moving the electrode arc member towards or away from the work surface whereby the arc member may be positioned for producing an electric arc discharge between said arc member and the work surface upon application of an electrical voltage to said arc member, said electrode support means including spring-loaded detents engaging a side of said arc member for yieldably clamping said arc member whereby said arc member may be moved into engagement with said work surface to position said arc member in said support means relative to the work surface whereby the cutting surface of the arc member will be uniformly spaced from the work surface when an electrode gap is established between the arc member and the work surface;

means for applying an electrical voltage to the electrode arc member for producing arc discharges of electrical current between the electrode arc member and the work surface;

means for supplying an electrically non-conductive fluid to the area of the work surface to be notched while said arc discharges are being produced to thereby flush residue material produced by said arc discharges from the notched area; and means for moving said electrode arc member towards said work surface while maintaining production of said arc discharges to produce a notch of desired dimensions in the work surface.

19. Apparatus for producing a precision cut notch in a metal work surface, said apparatus comprising:
an electrode arc member adapted to cut a precision notch in a work surface, said electrode arc member being configured to produce a correspondingly shaped notch in said work surface with precisely defined sides, end walls and a bottom wall;

electrode support means supporting the electrode arc member in proximity to said work surface;

hydraulic control means for selectively moving the electrode arc member towards or away from the work surface whereby the arc member may be positioned for producing an electric arc discharge between said arc member and the work surface upon application of an electrical voltage to said arc member, said electrode support means including means for yieldably clamping said arc member whereby said arc member may be moved into engagement with said work surface to position said arc member in said support means relative to the work surface whereby the cutting surface of the arc member will be uniformly spaced from the work surface when an electrode gap is established between the arc member and the work surface;

means for applying an electrical voltage to the electrode arc member for producing arc discharges of electrical current between the electrode arc member and the work surface;

means for supplying an electrically non-conductive fluid to the area of the work surface to be notched while said arc discharges are being produced to thereby flush residue material produced by said arc discharges from the notched area; and means for moving said electrode arc member towards said work surface while maintaining production of said arc discharges to produce a notch of desired dimensions in the work surface.

* * * * *